Oct. 27, 1931.  C. B. KINGSLEY  1,829,409
METHOD AND APPARATUS FOR PRODUCING SHEET GLASS
Filed Feb. 28, 1927  3 Sheets-Sheet 1
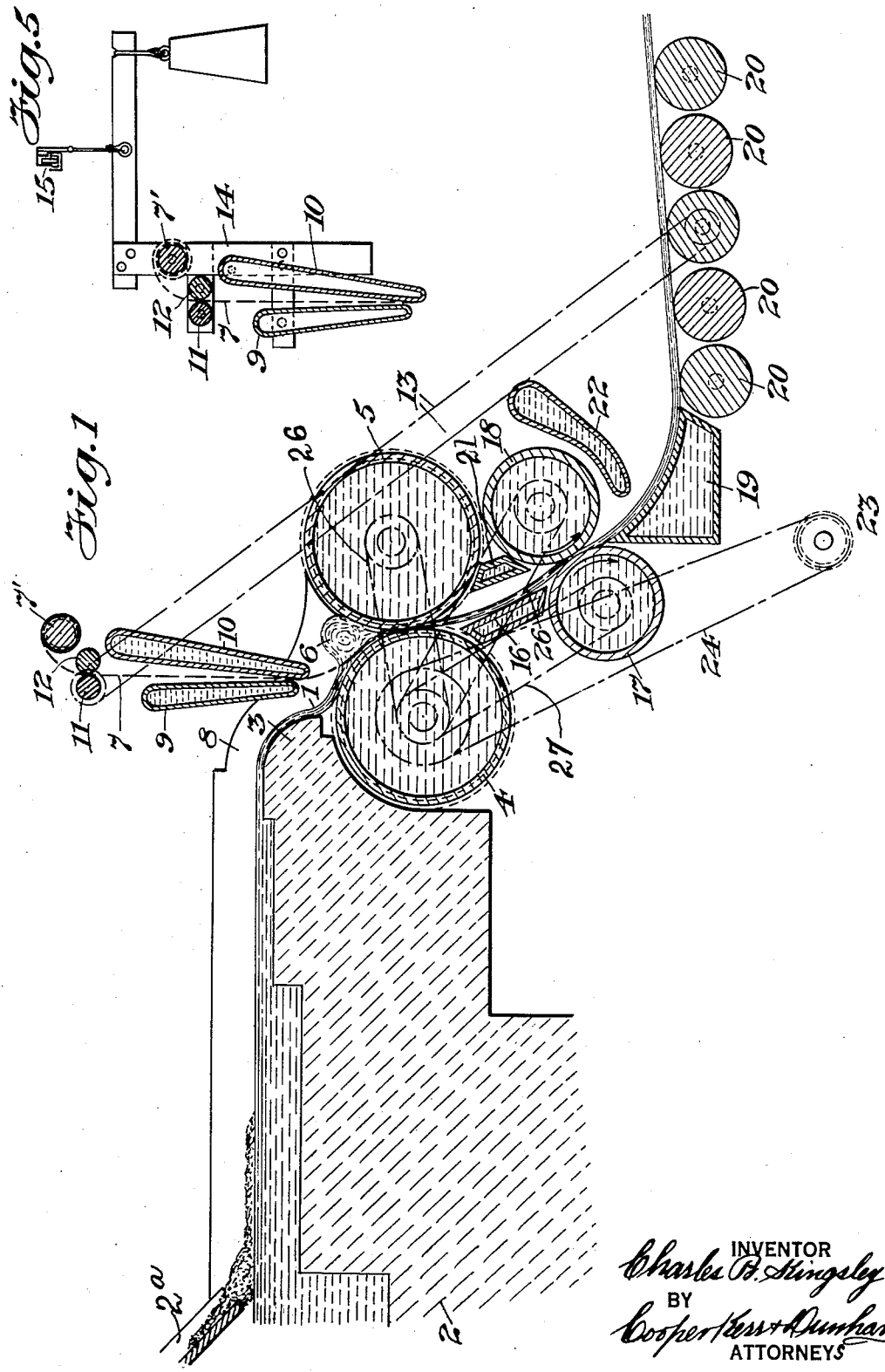

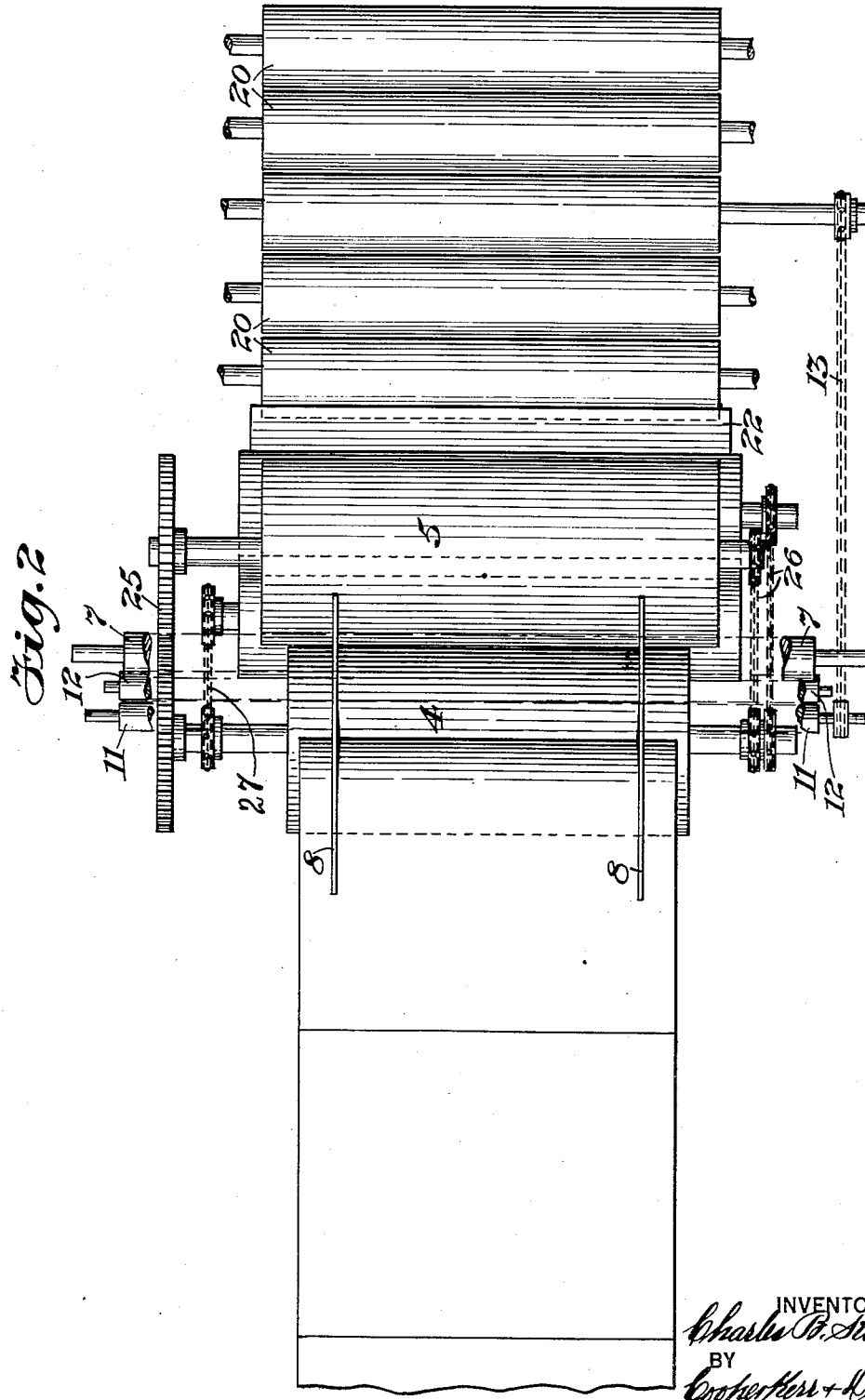

Oct. 27, 1931.  C. B. KINGSLEY  1,829,409
METHOD AND APPARATUS FOR PRODUCING SHEET GLASS
Filed Feb. 28, 1927  3 Sheets-Sheet 3
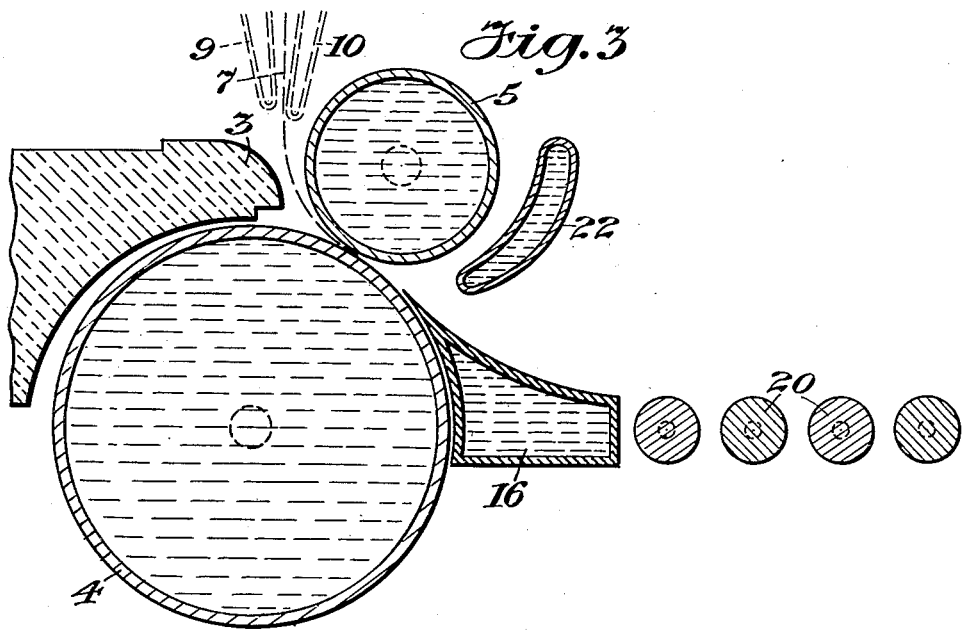
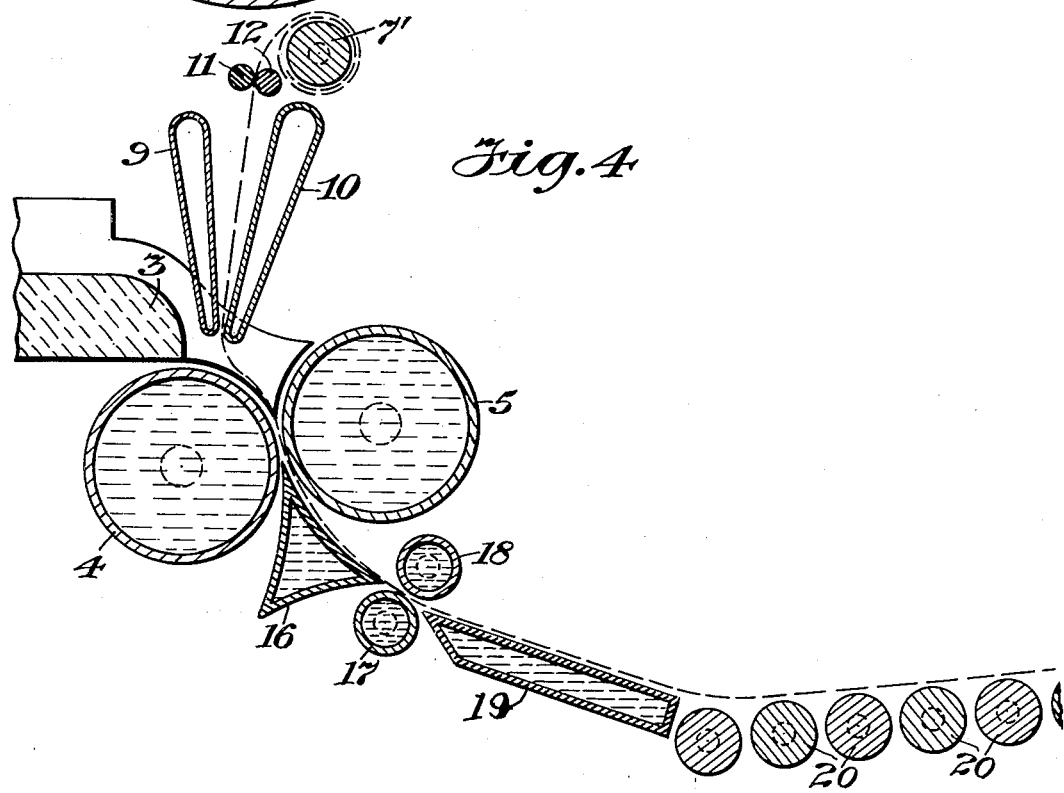

Patented Oct. 27, 1931

1,829,409

UNITED STATES PATENT OFFICE

CHARLES B. KINGSLEY, OF CLAIRTON, PENNSYLVANIA, ASSIGNOR TO MISSISSIPPI GLASS COMPANY, A CORPORATION OF NEW YORK

METHOD AND APPARATUS FOR PRODUCING SHEET GLASS

Application filed February 28, 1927. Serial No. 171,473.

The present invention relates to the production of sheet glass, plain or figured, and sheet wire glass, plain or figured, and particularly to the continuous production thereof.

Heretofore attempts have been made to produce sheet glass by a gravity flow of the molten metal to forming rolls, but success has not been attained and sheet glass manufacturers desiring continuous sheet production have resorted to other methods. I have discovered that the gravity method of producing sheet glass has advantages over other methods and that sheet glass, plain or wire and figured, if desired, can be produced successfully by my new method and in a continuous sheet.

I have discovered that by flowing the molten metal from a glass tank spout in a stream having a width substantially that of the sheet to be formed into the pass of a pair of forming rolls, and forming the sheet at substantially the temperature of the metal as it comes from the tank, I am able to produce commercial sheet glass of high fire polish, either plain or figured glass and plain or figured wire glass, and to successfully carry on the operation continuously, and to produce a product free of the defects of the products of the casting method, for example, and at a considerable saving of time and cost of production.

The new method and apparatus comprises a tank which feeds continuously and by gravity molten metal through a spout substantially coextensive with the width of the sheet to be formed to a pair of forming rolls which form the molten stream into a sheet of the desired width and thickness at substantially the temperature at the spout, and the formed sheet is passed to a lehr where it is annealed and, when desired, in my method, as the molten metal comes from the spout, it is fed on to one of a pair of forming rolls and what may be termed a ball of metal is formed at the pass between the two forming rolls and is coextensive therewith and with the spout, and this ball is under control and insures a sufficient supply of metal for the forming of the full width of the sheet. I have found it desirable to maintain this ball of small volume, although the volume may be varied to meet the needs of service.

In the accompanying drawings, I have shown by way of illustration, forms of apparatus for practicing my new methods which I have found successful in the production of plain or figured sheet and plain or figured sheet wire glass, and in which Fig. 1 is a sectional elevation showing the relation of the continuously flowing metal from the tank, the spout, the forming rolls, the figuring and smoothing rolls, the guiding members, and the lehr rolls, together with shielding members for protecting the rolls from the effects of heat rays from the molten and plastic sheet being formed and produced, and the chute for feeding, guiding and protecting the wire to its point of entry into the molten glass, and mechanism for driving all the parts cooperatively;

Fig. 2 is a plan of the apparatus shown in Fig. 1, with the wire feed mechanism removed;

Fig. 3 is a modification of the apparatus for producing plain or figured glass or plain or figured sheet wire glass;

Fig. 4 is a further modification of the apparatus of Fig. 3 in which a pair of finishing rolls is utilized in the method to finish the formed sheet as it comes from the forming rolls, and this can be a pair of smooth rolls for flattening the sheet, or one or both may be figured rolls;

Fig. 5 shows details of apparatus for feeding the wire mesh.

My new method comprises flowing molten metal 1 in a stream from a tank 2 and over a wide spout 3, and when desired for continuous operation glass making materials are introduced into the tank through a chute 2a in sufficient quantities to maintain desired operating molten metal levels in the tank 2. The stream of molten metal 1 is substantially of the width of the sheet to be formed and travels to and through the pass of a pair of hollow water cooled forming rolls 4 and 5 which are slightly longer than the width of the sheet to be formed. As the broad stream of glass comes to the rolls from the spout, it falls on the roll 4 and is carried forward to the pass between the rolls 4 and 5, and a ball of metal 6 co-extensive with the width of the sheet to be formed is permitted to accumulate at the pass to insure a sufficient supply of metal along the length of the pass. As the molten stream 1 passes over the roll 4 toward the pass between it and roll 5, a sheet of wire fabric 7 is fed into the top surface of the molten metal as it passes to the ball 6 and the pass between the rolls.

The ball of metal is maintained in position by means of guns 8 and 8, although it is to be understood that these guns can be dispensed with in those cases where the speed of formation of the sheet is carried on with a ball reduced to a minimum, nor will they be necessary in the production of sheet glass which later is to be ground and polished in a separate step.

A step of importance in the method is that of feeding the wire mesh 7 to the molten metal as it passes over the roll 4 in the direction of the ball 6 and the pass. I have discovered that by utilizing water-cooled shields 9 and 10, one on each side of the mesh, and having the opening of said shields close to the molten metal, that the wire mesh is preserved from oxidation and passed into the molten metal, in its original condition and with the desired bright polish thereof unimpaired. The water-cooled shield members 9 and 10, forming a chute for the wire mesh, are adjustable horizontally and vertically to assure the introduction of the wire mesh into the molten metal at the proper point between the spout 3, the ball 6, and the pass.

The molten metal 1 as it leaves the spout 3 is at an elevated temperature and as it is fed on to the water-cooled roll 4, the under surface acquires a slight stiffness due to the contact, and this surface stiffness is availed of in my method to support and float the wire mesh as it is fed into the upper surface in approximately a position which will be the center of the sheet when it has passed between the forming rolls. The top molten metal at the point of entry of the wire mesh is practically unaffected by the cooling effect of roll 4 and the metal on the upper surface therefore is fluid enough to flow through the mesh and about the strands thereof and supply the glass to form the upper part of the sheet to be formed in the pass. The wire mesh 7 is fed at the speed of the molten metal over roll 4 and sufficient slack in the feed of the mesh is maintained to permit of the proper floating of the mesh 7 into the molten glass and on to the chilled surface in contact with roll 4 without distortion as the sheet is formed which is provided by the proper adjustment of the guiding slot and the operation of the feeding rolls 11 and 12 above them, and which are driven by a chain 13 for feeding the wire mesh 7 at the desired speed. The water-cooled chute members 9 and 10, the wire mesh roll 7' and the rolls 11 and 12 for feeding the wire mesh are mounted on a counter-balanced arm 14, supported from a trolley track 15, which arrangement permits of the adjustment, vertically and horizontally of the said wire feeding mechanism as conditions in the flow of the molten metal are varied.

The wire mesh and the surface in contact with the roll 4 pass under the ball and into the pass between the water-cooled rolls 4 and 5 where the molten metal at the top, in turn, has its surface stiffened due to its contact with the water-cooled roll 5 and as the sheet emerges from the pass, the wire mesh is sustained in the center between the two stiff surfaces and at this point, the formed sheet is exceedingly plastic but is sufficiently strong to maintain its form and is passed to an apron 16. This apron 16 should be located a sufficient distance below to allow the formed sheet to rapidly cool at this point and acquire sufficient additional stiffness to maintain its structure intact. After reaching the apron, it is stiff enough to be self-supporting on the apron and still plastic enough to pass between a figured roll 17 and a smoothing roll 18 where a figure design is impressed on the sheet, if desired. After leaving the pass of the rolls 17 and 18, the sheet has been cooled considerably and is received by a water-cooled apron 19 and turned in the direction of the rolls 20 to the lehr.

It is found desirable to protect the rolls 5 and 18 from the effects of the heat of the plastic formed sheet and I have provided water-cooled shields 21, 22 for each of these rolls, it being understood that the members 16 and 19 perform this shielding function for the rolls 4 and 17. A shaft 23 is shown for operating the members of the apparatus above described and suitable driving mechanism such as a chain is indicated from the shaft 23 to the roll 4 at 24 and gears from the roll 4 to the roll 5 at 25, and a chain from the roll 5 through a loose sprocket on roll 4 to the roll 18 at 26, and a chain from roll 4 to roll 17 at 27.

The position of the rolls with relation to the spout is important, and in the production of plain or figured sheet glass, I am able to obtain glass of good quality and high fire polish by locating the forming rolls 4 and 5 as shown in Fig. 3, close to the spout and forming the sheet at substantially the temperature of the molten metal as it comes from the spout, after which it is directly passed to the lehr rolls 20; and in the production of wire glass of high polish, either plain or figured, I place the roll 5 of the forming rolls a short distance away from the spout to provide room for the feeding of the wire to the glass as it comes from the spout, as shown in the other figures, and while forming the sheet at substantially the temperature of the molten metal at the spout. The forming rolls are water-cooled and maintained at a cooling temperature such that the contacting surfaces of the glass sheet are stiffened in the pass and a fire-polished surface obtained. In the production of wire glass, the wire is floated on to the molten metal under control at a suitable point between the pass and the spout and due to the contact cooling of the surfaces of the sheet as the sheet is formed in the pass, and the consequent stiffening of the faces of the sheet, the wire mesh is centered in the relatively softer center of the sheet as it is formed, and any tendency of the wire to approach either of the outer surfaces of the sheet is thus resisted by the said stiffer surfaces. The sheet, as it leaves the pass, is in plastic condition, and it is desirable, in some cases, to let the sheet drop straight-away on its line of travel from the pass until sufficient stiffness has been acquired by the formed sheet to hold the wire mesh in place in the center thereof.

While I have mentioned mesh wire above, it is to be understood that single strand wire or any form of wire reinforcement may be fed to the glass for the production of sheet wire glass and the distance of the receiving apron from the pass will be varied according to the type of glass being produced. With some thicknesses of glass, the stiffening of the sheet takes place near the pass and the apron 16 can accordingly be placed relatively far away therefrom. With other thicknesses, the stiffening does not occur quite so rapidly and in that case the apron 16 will be placed nearer to the pass to support the plastic sheet in its travel to the lehr rolls.

A feature of importance is that the molten stream from the spout is conveyed a short distance on and over one of the rolls before entering the pass and the surface of the glass in contact with the roll is stiffened and serves as a support for the wire mesh as the glass is conveyed to and goes through the pass of the rolls while the upper surface is free to receive the wire with the least possible resistance and permit the more fluid top portion of the flow to pass readily through the mesh and form the ball of metal which in turn supplies the metal to form the top half of the sheet in the pass. The other roll is in contact with the other surface only for a relatively short distance and short time, and does not, therefore, stiffen the surface with which it is in contact to quite the same degree as the opposite surface, but sufficiently to confine the wire mesh centrally of the surfaces, and the upper surface thereby develops the desired high fire polish. As the formed sheet proceeds, it is passed between rolls 17 and 18, one being the figured roll and the other a smooth roll serving as a flattening roll, said rolls furnishing enough pressure to cause the sheet to take the impression from the figured roll, or both rolls can be smooth flattening rolls, or figured flattening rolls, and both rolls serving to cool the sheet considerably at this point so that it can be handled by the receiving apron or directly laid upon the receiving lehr rolls. The steps of the method thus described are all accomplished at temperatures closely approximating those of the molten metal as it comes from the tank and are all accomplished with the molten and plastic finished material at temperatures considerably above those used in other methods of producing sheet glass, and the glass, as it leaves the lehr, which is the end of the operation, has a high degree of finish.

As a further advantage over the casting methods now in use for producing a similar article, a better product is obtained, both as to surface and as to flatness, and the end losses by the intermittent casting method now in use are entirely avoided by the new method resulting in considerable saving in the cost of production of the sheet glass and the figured glass has greater brilliancy and the wire is free from trapped air as in the other method.

Another advantage is that the usual fluted roll for centering the wire in the sheet of the old method is dispensed with in this method and the consequent marks of oxidizing on the wire mesh and imprints of the fluted roll are absent in the product of the new process.

The temperature of the glass as it comes from the tank varies between about 2150 and about 2350 degrees Fahr., depending upon the kind of glass being produced by the system. In the case of thin figured glass (which is of ⅛ inch thickness) the preferred temperature of the metal at the spout is about 2200 degrees and the temperature of the molten sheet in the pass at the forming rolls is approximately 1800 degrees, but in the case of wire glass of one-quarter inch thickness, the temperature of the molten metal at the spout is about 2300 degrees and the temperature as it comes in the pass of the rolls is probably about 2000 degrees. The product of the present method is free from the defects of the product of the casting method—that is to say the caramel effect is less pronounced, the sheet is flat and cold ball marks of the old process are absent and, further, if it is desired to polish the product of the new process, as would be the case if single strand windshield wire glass for automobiles was being produced, or polished wire glass of any type, less grinding would have to be done and the cost and time of the polishing operation considerably reduced. The saving in the cost of producing polished glass will be apparent when it is stated that by the casting method, to produce polished glass of one quarter inch thickness, it is necessary to cast approximately a half inch sheet, whereas with the present process, it would only be necessary to produce a sheet three-eighths of an inch thick due to the flatness and uniformity of the sheet of the present method.

The advantage of performing all the steps of the method on the molten metal in the high temperature areas is that the glass sheet can be produced at high speed without sacrificing quality. In fact, the higher the speed of production and the higher the temperature at which the steps are performed with relation to the temperature of the molten glass as it is fed, the better are the results obtained as to the quality of the glass sheet, which is produced free of air bubbles, striations, waves, crizzles or checks, which marks and defects are incident to the production of glass sheet by the casting table method. For example, I have successfully produced by my method and apparatus commercial glass sheet figured on one side of one eighth inch thickness and sixty-four inches in width at the rate of twelve feet per minute while a similar glass sheet thirty-six inches in width was produced at the rate of eighteen feet per minute, and further in the case of figured wire glass sheet of five-sixteenths thickness and forty inches wide I have produced such a sheet at the rate of ten feet per minute.

By virtue of the practical straight line flow of the glass from the spout to and through the pass in the present method, surface markings on the finished product due to trapped air are avoided, and in the production of figured glass certain types which are impossible of production by the casting method are now easily produced by the present method.

In operation and when producing plain glass, the speeds of the lehr rolls with relation to the forming rolls may be the same or, if it is desired, the lehr rolls may have a slight lead over the forming rolls. In the case of wire glass, however, the formed sheet must be supported and carried at such a speed at the different points and stages in the operation that allowance is made for the contracting of the glass in the sheet and that no disturbance of the wire takes place from its original position as it enters the flow, and it is found necessary to operate the rolls of the forming and finishing member with a slight lead over the speed of the rolls of the lehr to compensate for the contraction of the formed sheet between the pass of the forming rolls and the lehr, due to the cooling effect of the inserted wire and due to the contact with the rolls and aprons and general radiation between these points. Furthermore, tension on the sheet is to be avoided for while the surfaces of the glass sheet are stiff enough to support the wire mesh in the center in place, still they are, at this point, very soft and any pressure or tension exerted on the wire before further rigidity is acquired tends to distort the wire and disturb its position in the formed sheet, and for this reason the forming rolls are run with a lead to insure that no pull is exerted on the wire mesh in the sheet being formed as a pull at this time on the plastic sheet will elongate the mesh, drawing in the sides thereof and disturbing the relation of the mesh to the surfaces of the glass sheet in which it is embedded as the glass at this time is too plastic and soft to resist the elongating movement of the mesh if a pull is exerted. After the glass sheet has reached the lehr, sufficient rigidity has been acquired by the sheet to resist the effects of any pull.

It is to be understood that in the method and apparatus herein described the mass of the strain of metal 1 flowing by gravity from the tank 2 over the spout 3 and the mass of the sheet formed in the pass are substantially equal at all times, and that variations in the flow from the spout are taken up by varying the speed of the forming rolls 4 and 5, or varying the flow at the spout as by a flow controlling gate.

While I have shown a pair of forming rolls, it is possible that the metal can be passed through a water-cooled slot at this point to form the sheet and it is to be understood that such an embodiment is within the scope of my invention.

I claim:

1. The method of producing reinforced wire glass, which comprises feeding molten metal to a sheet forming pass, cooling one surface of the metal before it reaches said pass whereby said cooled surface is stiffened, feeding reinforcing wire into said metal after said stiffened surface is formed, and limiting the depth of penetration of said wire into said metal by the thickness of said stiffening surface.

2. In the method of producing sheet glass, the steps of flowing molten metal to a forming pass over a cooled roll whereby the lower surface of the metal will be stiffened before the metal reaches the forming pass, feeding reinforcing wire into said metal after said stiffened surface is formed, and limiting the depth of penetration of said wire into said metal by the thickness of said stiffening surface.

3. In the method of producing sheet glass in a forming pass between a pair of cooling rolls having axes in substantially the same horizontal plane, the steps of flowing molten metal over one of said rolls whereby the lower surface of the metal will be stiffened before the metal reaches the forming pass, feeding reinforcing wire into said metal after said stiffened surface is formed, and limiting the depth of penetration of said wire into said metal by the thickness of said stiffening surface.

4. In the method of producing sheet glass, the steps of flowing molten metal to a forming pass in a comparatively thin layer over a cooled roll whereby the lower surface of the metal will be stiffened before it reaches the pass, feeding reinforcing wire into said metal after said stiffened surface is formed, limiting the depth of penetration of said wire into said metal by the thickness of said stiffened surface, gathering metal from said layer to form a ball of molten metal above said pass, and feeding metal from said ball through said pass to complete the sheet.

In testimony whereof I hereto affix my signature.

CHARLES B. KINGSLEY.